United States Patent [19]

Sobotta

[11] 4,127,323
[45] Nov. 28, 1978

[54] STILL PROJECTOR WITH SPARE PROJECTION LAMP

[75] Inventor: Reinhard Sobotta, Brunswick, Mascherode, Fed. Rep. of Germany

[73] Assignee: Rollei-Werke Franke & Heidecke, Brunswick, Fed. Rep. of Germany

[21] Appl. No.: 829,082

[22] Filed: Aug. 30, 1977

[30] Foreign Application Priority Data

Sep. 28, 1976 [DE] Fed. Rep. of Germany ... 7628047[U]

[51] Int. Cl.² ............................................. G03B 21/16
[52] U.S. Cl. ....................................... 353/61; 353/119
[58] Field of Search .................. 353/87, 116, 117, 119, 353/61, 85

[56] References Cited

U.S. PATENT DOCUMENTS 3,130,637  4/1964  Golden .................................... 353/61
3,529,146  9/1970  Betlejewski et al. .................. 353/87

Primary Examiner—Steven L. Stephan
Attorney, Agent, or Firm—Stonebraker, Shepard & Stephens

[57] ABSTRACT

A still projector having a closure plate covering a housing aperture providing access to a projection lamp has a storage chamber within the housing positioned to be covered by the closure plate when the closure plate closes the aperture and to be accessible when the closure plate is removed from the aperture. The storage chamber is shaped to receive and store a spare projection lamp and preferably also a lamp changing tool. The closure plate is preferably a slide plate fitting flush with an exterior surface of the housing and extending over a cooling fan and its drive motor. The closure plate prefereably has air passage slots located over the fan, and the storage chamber is preferably formed as a depression in the projector housing over the drive motor.

3 Claims, 1 Drawing Figure

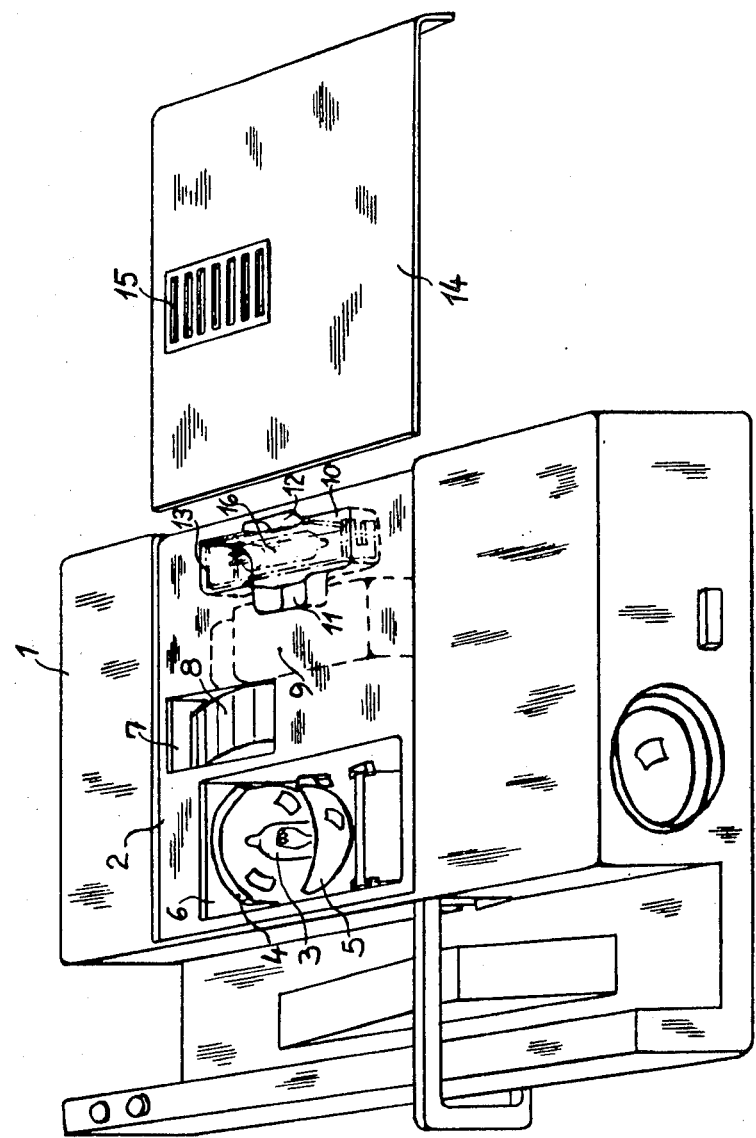

STILL PROJECTOR WITH SPARE PROJECTION LAMP

BACKGROUND OF THE INVENTION

The invention relates to still projectors having projection lamps arranged within apertures covered by a closure plate so that the lamp is accessible for changing occasionally. Since projection lamps usually burn out when lit, lamp changing usually occurs at a time when slide projection is desired, and time is often consumed in searching for the spare lamp that a prudent operator keeps available. It is easy to forget where the spare lamp is stored, and the lamp is likely to become damaged or lost when it has to be transported about with the projector.

The invention recognizes these problems and involves a simple and convenient solution to the spare projection lamp problem. The invention aims at simplicity and convenience without any substantial additional expense in facilitating replacement of the projection lamp.

SUMMARY OF THE INVENTION

The invention applies to a still projector having a housing enclosing a projection lamp, an aperture in the housing providing access to the projection lamp, and a closure plate for closing the aperture. A storage chamber is formed within the housing and is positioned to be covered by the closure plate when the closure plate covers the aperture and to be accessible when the closure plate is removed to open the aperture to provide access to the projection lamp. The storage chamber is shaped to receive and store a spare projection lamp that is conveniently accessible when the closure plate is removed for changing the projection lamp. The storage chamber also preferably receives and holds a lamp changing tool along with the spare projection lamp. Also, the closure plate is preferably a slide plate fitting within a recess in the housing to be flush with an exterior surface of the housing. Moreover, the closure plate is preferably arranged to extend over a cooling fan and its drive motor, with the storage chamber being formed as a depression in the housing in a region above the drive motor.

DRAWING

The drawing is a perspective view of a preferred embodiment of the inventive projector showing a closure plate removed to one side of the projector.

DETAILED DESCRIPTION

The illustrated preferred embodiment of the inventive projector has a housing 1 that encloses several working components. A shallow cavity or recess 2 is formed in the top of housing 1 to extend from a side wall of the housing across the entire width of the housing top. An aperture or opening 6 is formed in recess 2 to allow access to projection lamp 3, reflecting mirror 4, and condenser 5. Another opening 7 in recess 2 provides a passageway to a portion of the circumference of a fan or blower 8 that is generally parallel with the optical system. A split-pole motor 9 for driving fan wheel 8 is arranged below recess 2 on the shaft of the fan wheel to be coaxial with and adjacent to fan wheel 8.

In a region approximately above motor 9, housing recess 2 is formed with a depression 10 having side depressions 11 and 12 providing finger access. Depression 10 forms a storage chamber shaped to hold a spare projection lamp 16 and preferably also a tool 13 for changing projection lamps. A thumb and forefinger can be inserted into recesses 11 and 12 to grip and remove tool 13 and subsequently the spare projection lamp 16. This makes spare projection lamp 16 accessible for replacement of projection lamp 3 when closure plate 14 is removed as illustrated. It also insures that spare projection lamp 16 is well protected and conveniently available whenever a projection lamp must be changed.

Closure plate 14 is a sliding plate shaped to be received in recess 2 in a sliding fit to cover the entire recess 2 in a flush fit with the upper surface of housing 1. Closure plate 14 has air passage slots 15 that register with aperture 7 to provide air passage for fan wheel 8 when closure plate 14 is fully inserted into recess 2 in a closed position. In the closed position closure plate 14 covers chamber 6, aperture 7, and the storage chamber formed by depression 10. This fully protects spare projection lamp 16 and prevents it from being lost or damaged, and it provides an economical way of forming air passage slots 15 at the same time that cover plate 14 is formed or stamped out. In its closed position closure plate 14 also fits flush with the outer side wall of projector housing 1, and closure plate 14 is readily moved manually between its closed position and the illustrated open or removed position.

What is claimed is:

1. A still projector comprising a projection lamp for illuminating a picture to be projected, a motor driven fan for inducing a current of air to assist in cooling said projection lamp, spare lamp holding means located in such position that said fan is between said holding means and said projection lamp so as to lessen transmission of heat from said projection lamp to a spare lamp in said holding means, and housing means enclosing said projection lamp, said fan, and said spare lamp holding means, said housing means including a cover section movable from a closed position to an open position to provide access to said projection lamp and to a spare lamp in said holding means.

2. The invention defined in claim 1, wherein said spare lamp holding means serves also to hold a lamp changing tool.

3. The invention defined in claim 1, wherein said cover section of said housing means is in the form of an approximately horizontally movable slide member overlying said projection lamp, said fan, and said spare lamp holding means and forming with other portions of said housing means an approximately flush continuous top wall of the housing means, when said cover section is in its closed position.

* * * * *

UNITED STATES PATENT AND TRADEMARK OFFICE
CERTIFICATE OF CORRECTION

PATENT NO. : 4,127,323

DATED : 28 November 1978

INVENTOR(S) : Reinhard Sobotta

It is certified that error appears in the above-identified patent and that said Letters Patent are hereby corrected as shown below:

In the heading of the patent, item 30, Foreign Application Priority Data, for "Sep. 28, 1976" read --Sep. 8, 1976--.

Signed and Sealed this

Twentieth Day of February 1979

[SEAL]

Attest:

RUTH C. MASON
Attesting Officer

DONALD W. BANNER
Commissioner of Patents and Trademarks